(12) United States Patent
Lee et al.

(10) Patent No.: US 7,643,684 B2
(45) Date of Patent: Jan. 5, 2010

(54) APPARATUS FOR AND METHOD OF CONSTRUCTING MULTI-VIEW FACE DATABASE, AND APPARATUS FOR AND METHOD OF GENERATING MULTI-VIEW FACE DESCRIPTOR

(75) Inventors: Won-sook Lee, Suwon-Si (KR); Kyung-ah Sohn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1211 days.

(21) Appl. No.: 10/891,263

(22) Filed: Jul. 15, 2004

(65) Prior Publication Data
US 2005/0013507 A1    Jan. 20, 2005

(30) Foreign Application Priority Data
Jul. 15, 2003  (KR)  ............. 10-2003-0048472
Jul. 9, 2004   (KR)  ............. 10-2004-0053686

(51) Int. Cl.
G06K 9/66   (2006.01)
G06K 9/60   (2006.01)
H04N 7/18   (2006.01)

(52) U.S. Cl. .......... 382/190; 382/118; 382/305; 348/135; 348/152; 348/169

(58) Field of Classification Search .......... 382/100, 382/103, 115, 118, 181, 190, 195, 197, 199, 382/201, 203–206, 209, 216–221, 294, 305; 348/135–143, 152–161, 169–172
See application file for complete search history.

(56) References Cited

U.S. PATENT DOCUMENTS 5,164,992  A  *  11/1992  Turk et al. ............. 382/118
5,561,718  A  *  10/1996  Trew et al. ............. 382/118
5,802,208  A  *   9/1998  Podilchuk et al. ...... 382/224
6,137,896  A  *  10/2000  Chang et al. .......... 382/118
6,411,724  B1 *   6/2002  Vaithilingam et al. .... 382/100
6,430,306  B2 *   8/2002  Slocum et al. ......... 382/118
6,631,364  B1 *  10/2003  Rioux et al. ............ 707/2

(Continued)

OTHER PUBLICATIONS

D. Blackburn, M. Bone, and P. Phillips. Facial Recognition Vendor Test 2000: Executive Overview, 2000.

(Continued)

*Primary Examiner*—Manav Seth
(74) *Attorney, Agent, or Firm*—Staas & Halsey LLP

(57) ABSTRACT

An apparatus for generating a multi-view face descriptor includes a multi-view face database storing sets of training face images and sets of test face images, each set including a mosaic view of a single identity; a basis matrix generator generating a basis matrix of the training face images shown from respective viewpoints searched from the multi-view face database; a feature extractor extracting feature vectors of a test face image shown from each viewpoint using the basis matrix of the training face images searched from the multi-view face database; a to-be-registered view selector searching the test face images using the feature vectors extracted by the feature extractor and selecting a plurality of viewpoints as registered viewpoints according to the search results; and a face descriptor generator generating a multi-view face descriptor by synthesizing face descriptors having the plurality of selected viewpoints.

22 Claims, 16 Drawing Sheets

U.S. PATENT DOCUMENTS

| | | | |
|---|---|---|---|
| 6,879,323 B1 * | 4/2005 | Takezawa et al. | 345/420 |
| 6,996,257 B2 * | 2/2006 | Wang | 382/118 |
| 7,043,474 B2 * | 5/2006 | Mojsilovic et al. | 707/6 |
| 7,164,781 B2 * | 1/2007 | Kim et al. | 382/118 |
| 7,184,577 B2 * | 2/2007 | Chen et al. | 382/118 |
| 7,203,346 B2 * | 4/2007 | Kim et al. | 382/118 |
| 7,254,257 B2 * | 8/2007 | Kim et al. | 382/118 |
| 7,298,931 B2 * | 11/2007 | Kim et al. | 382/305 |
| 7,321,670 B2 * | 1/2008 | Yoon et al. | 382/118 |
| 7,340,458 B2 * | 3/2008 | Vaithilingam et al. | 707/5 |
| 7,471,833 B2 * | 12/2008 | Skarbek et al. | 382/226 |
| 7,478,091 B2 * | 1/2009 | Mojsilovic et al. | 707/6 |
| 2002/0159640 A1 * | 10/2002 | Vaithilingam et al. | 382/218 |
| 2003/0086627 A1 * | 5/2003 | Berriss et al. | 382/305 |
| 2003/0165260 A1 * | 9/2003 | Kim et al. | 382/118 |
| 2003/0169908 A1 * | 9/2003 | Kim et al. | 382/118 |
| 2003/0215115 A1 * | 11/2003 | Kim et al. | 382/118 |
| 2004/0170327 A1 * | 9/2004 | Kim et al. | 382/217 |
| 2007/0258627 A1 * | 11/2007 | Geng | 382/118 |

OTHER PUBLICATIONS

D. Blackburn, M. Bone, and P. Phillips. Facial Recognition Vendor Test 2000: Evaluation Report, 2000.

P. J. Phillips, H. Moon, S. Rizvi, and P. Rauss. *The FERET Evaluation Methodology for Face Recognition Algorithms*: IEEE Trans. On PAMI, 22(10): 1090-1103, 2000.

M. Turk and Pentland, *Face recognition Using Eigenfaces*, 1991.

P.N. Belhumeur, J.P. Hespanda and D. J. Kriegman, *Eigenfaces vs. Fisherfaces: Recognition using Class Specific Projection*, IEEE Trans PAMI, vol. 19, No. 7, 1997, pp. 711-720.

H. Sebastian Seung and Danial D. Lee, *The Manifold Ways of Perception*, Science, vol. 290, Dec. 22, 2000.

Joshua B Tenenbaum, Vin de Silva, and John C. Langford, *A Global Geometric Framework for Nonlinear Dimensional Reduction*, Science, vol. 290, Dec. 22, 2000.

Carrie Grimes and David Donoho, *Can These Things Work? Theoretical Result for ISOMAP and LLE*, 2002.

H. Chen, P. Belhumeur and D. Jacobs. *In Search of Illumination Invariants*, Int. Journal of Computer Vision, 2000.

A. Georghiades, P.N. Belhumeur, and D. Kriegman. *From few to many: generative models of recognizing faces under variable pose*, Jun. 2001.

Won-sook Lee et al., Multi-view 3D-Face Descriptor: Proposal for CE, ISO/IECJTC1/SC29/WG11 (Jul. 2003).

Takeo Kanade et al., "Multi-Subregion Based Probalistic Approach Toward Pose-Invariant Face Recognition", IEEE; (Jul. 2003).

Xiaofei He et al., "Learning a Locality Preserving Subspace for Visual Recognition"; Proceedings of the Ninth IEEE International Conference on Computer Vision, (2003).

Shiguang Shan et al., "Illumination Normalization for Robust Face Recognition Against Varying Lighting Conditions", ITC-ISVISION JDL Institute of Computing Technology, Oct. 17, 2003.

\* cited by examiner

APPARATUS FOR AND METHOD OF CONSTRUCTING MULTI-VIEW FACE DATABASE, AND APPARATUS FOR AND METHOD OF GENERATING MULTI-VIEW FACE DESCRIPTOR

CROSS-REFERENCE TO RELATED APPLICATIONS

This application claims the priority of Korean Patent Application No. 2003-48472, filed on Jul. 15, 2003 in the Korean Intellectual Property Office, and Korean Patent Application No. 2004-53686, filed on Jul. 9, 2004 in the Korean Intellectual Property Office, the disclosures of which are incorporated herein in their entirety by reference.

1. Field of the Invention

The present invention relates to face recognition, and more particularly, to an apparatus for and a method of constructing a multi-view face database and an apparatus for and a method of generating a multi-view face descriptor, which can effectively deal with pose changes in a face image.

2. Description of the Related Art

Face detection is generally accomplished by comparing a given face image against face images in a database. However, when a single viewpoint query image is used and the face images in the database are shown under a large variety of poses and illumination conditions, it is difficult to extract the features of the query image and retrieve a face image identical or similar to the query image. Accordingly, conventional face recognition algorithms require a plurality of query images, and performance of face recognition using one or a few query images dramatically drops. To solve this problem, a face descriptor indicating feature vectors of a face image has been proposed. There are two types of face descriptors: a 2-D face descriptor and a 3-D face descriptor.

A method of generating a 2-D face descriptor and a face recognition method using a 2-D face descriptor are disclosed by M. Abdel-Mottaleb, J. H. Connell, R. M. Bolle, and R. Chellappa in "Face descriptor syntax," Merging proposals P181, P551, and P650, ISO/MPEG m5207, Melbourne, 1999. Also, the main functions of a face descriptor proposed in the MPEG-7 standard allow a face image to be effectively identified and restored using a query image. However, the method is unreliable when the face descriptor is applied to a set of face images having large differences in pose and illumination conditions. To overcome this problem in conventional 2-D face recognition method, the influences due to illumination changes are removed by eliminating a specific component of an image on a subspace spanned by a predetermined eigenvector. However, exact face recognition has been limited since the identity information of a person included in a principal component analysis (PCA) or linear discriminant analysis (LDA) projection was also removed in the eliminating process. Also, to remove influences due to pose changes of a face image input for recognition, a method of transforming a registered face image shown from a single viewpoint into face images shown from various viewpoints and generating face images shown from other viewpoints has been adopted. However, since errors may be included in a process of performing a viewpoint transformation and generating an image shown from another viewpoint, accuracy decreases when face recognition or identification authentication is performed using the method.

A conventional 3-D face descriptor is generated using 3-D information of a face obtained using specialized image acquisition equipment or a plurality of cameras. Another conventional 3-D face descriptor is obtained from a 2-D face image through a complex process. However, in both cases, the process of generating a 3-D face descriptor is expensive, and since face images of an identity to be registered are generated from a face image shown from a single viewpoint, the conventional 3-D face descriptor like a 2-D face descriptor cannot effectively deal with multi-view face images.

SUMMARY OF THE INVENTION

An aspect of the present invention provides an apparatus for and a method of constructing a multi-view face database, which can effectively deal with pose changes in a face image.

An aspect of the present invention also provides an apparatus for and a method of generating a multi-view face descriptor, which can effectively deal with pose changes in a face image.

According to an aspect of the present invention, there is provided an apparatus for constructing a multi-view face database comprising: an image capturer capturing a plurality of face images of a person shown from various viewpoints including a front view face image; an eye position determiner selecting a plurality of key-frame images from the face images provided by the image capturer and determining positions of eyes corresponding to respective viewpoints included in a mosaic view using positions of eyes of the selected key-frame images; a face localization unit performing localization of the face images included in the mosaic view based on the eye positions of the respective viewpoints, and arranging sizes and the eye positions of the face images shown from the respective viewpoints; and a mosaic view generator generating the mosaic view of the person by synthesizing the localized face images having the respective viewpoints.

According to another aspect of the present invention, there is provided a method of constructing a multi-view face database comprising: capturing a plurality of face images of a person shown from various viewpoints including a front view face image; selecting a plurality of key-frame images from the captured face images and determining positions of eyes corresponding to respective viewpoints included in a mosaic view using positions of eyes of the selected key-frame images; performing localization of the face images included in the mosaic view based on the eye positions of the respective viewpoints, and arranging sizes and the eye positions of the face images shown from the respective viewpoints; and generating the mosaic view of the person by synthesizing the localized face images having the respective viewpoints.

According to another aspect of the present invention, there is provided an apparatus for generating a multi-view face descriptor comprising: a multi-view face database storing sets of training face images and sets of test face images, each set including a mosaic view of a single identity; a basis matrix generator generating a basis matrix of the training face images shown from respective viewpoints searched from the multi-view face database; a feature extractor extracting feature vectors of a test face image shown from each viewpoint using the basis matrix of the training face images searched from the multi-view face database; a to-be-registered view selector searching the test face images using the feature vectors extracted by the feature extractor and selecting a plurality of viewpoints as registered viewpoints according to the search results; and a face descriptor generator generating a multi-view face descriptor by synthesizing face descriptors having the plurality of selected viewpoints.

According to another aspect of the present invention, there is provided a method of generating a multi-view face descriptor comprising: providing a multi-view face database storing sets of training face images and sets of test face images, each set including a mosaic view of a single identity; generating a basis matrix of the training face images shown from respective viewpoints searched from the multi-view face database; extracting feature vectors of a test face image shown from each viewpoint using the basis matrix of the training face images searched from the multi-view face database; and searching the test face images using the feature vectors extracted by the feature extractor, selecting a plurality of viewpoints as registered viewpoints according to the search results and generating a multi-view face descriptor by synthesizing face descriptors having the plurality of selected viewpoints.

BRIEF DESCRIPTION OF THE DRAWINGS

The above and other aspects and/or advantages of the present invention will become more apparent and more readily appreciated by describing in detail exemplary embodiments thereof with reference to Won-sook Lee et al., Multi-view 3D-Face Descriptor: Proposal for CE, ISO/IEC JTC1/SC29/WG11 (July 2003), the disclosure of which is incorporated by reference, and the accompanying drawings in which.

DETAILED DESCRIPTION OF THE EMBODIMENTS

Figure 1:
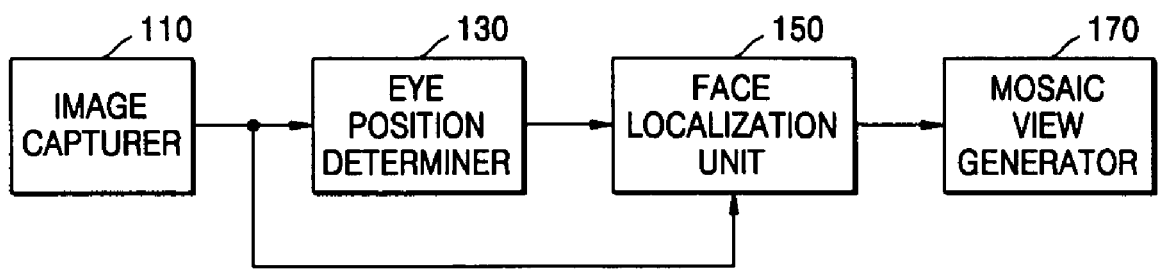
FIG. 1 is a block diagram of an apparatus for constructing a multi-view face database according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Terminology used in describing embodiments of the present invention is as follows. It is understood that equivalent terminology can be used and that the terminology is provided in order to explain the aspects of the invention described herein below. A mosaic view is a mosaic of face images obtained by successively and respectively rotating a face image right and left and up and down by a predetermined view interval about a horizontal axis and about a vertical axis in the intervals $[-X°, \ldots, X°]$ and $[-Y°, \ldots, Y°]$. In an embodiment of the present invention, X is equal to 90°, Y is equal to 30°, and the view interval is equal to 10°. However, it is understood that X, Y and the view angle are not limited to these values. A quasi view with respect to a given viewpoint is a viewpoint related to a face image which can be retrieved using the given viewpoint with a retrieval error less than or equal to 0.05 when expressed by average normalized modified retrieval rate (ANMRR), for instance. A quasi view region is a region of quasi views having a retrieval error less than or equal to 0.05 when expressed by the ANMRR, for instance. A quasi view size is the number of viewpoints related to face images which can be retrieved using a given viewpoint and a given retrieval error, for instance, a retrieval error less than or equal to 0.05 when expressed by the ANMRR. However, it is understood that other retrieval errors can be used.

Figure 6:
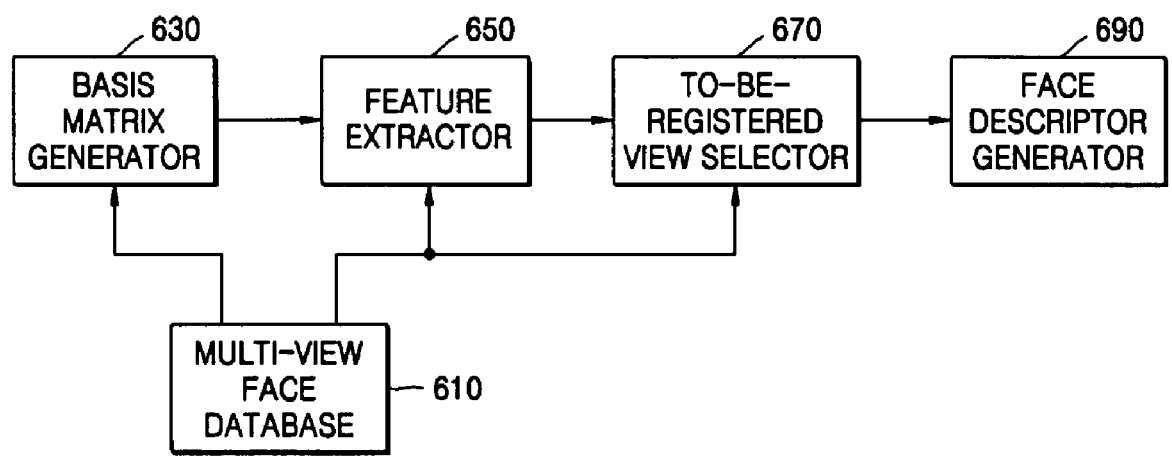
FIG. 6 is a block diagram of an apparatus for generating a multi-view face descriptor according to an embodiment of the present invention.
Figure 15:
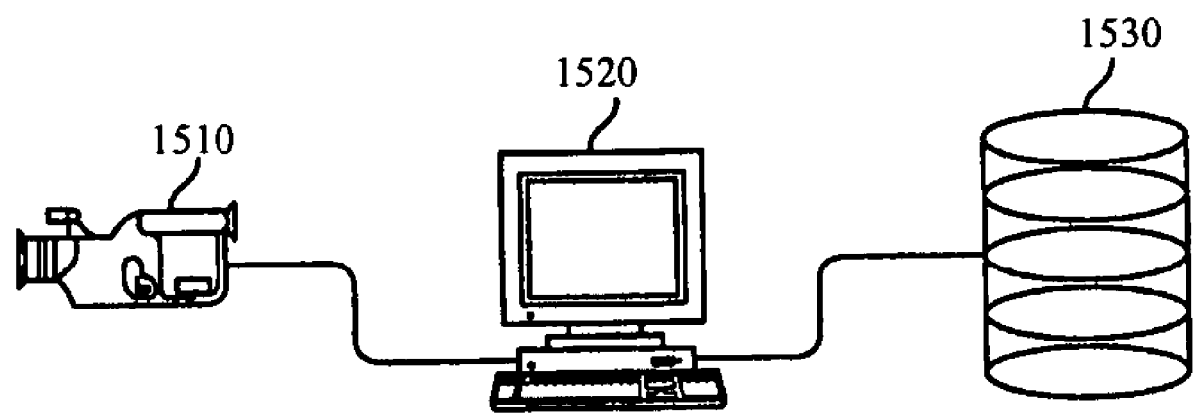
FIG. 15 is a block diagram of a system using the database and/or descriptor developed using the systems shown in FIGS. 1, 2 and/or 6 according to an aspect of the invention.

FIG. 1 is a block diagram of an apparatus for constructing a multi-view face database according to an embodiment of the present invention. Referring to FIG. 1, the apparatus includes an image capturer 110, an eye position determiner 130, a face localization unit 150, and a mosaic view generator 170. The multi-view face database 1530 shown in FIG. 15 or 610 shown in FIG. 6 is used for a set of training images and a set of test images. When used for identification, it is understood that the database 1530, 610 is used for identification of a query image using a system such as that shown in FIG. 15 according to aspects of the invention.

The image capturer 110 captures face images of a person from a plurality of viewpoints corresponding to each of left and right horizontal rotation angles divided into a constant view interval and each of up and down vertical rotation angles divided into a constant view interval, the face images including a front view face image. The image capturer 110 can be realized using a video camera with a 2-d mechanism, a camera, a laser scanner, and/or a built-in studio having a plurality of cameras and lights. Examples of a 2-d mechanism include a camera (such as a video camera) and a chair which rotates a person to be photographed on the chair in the horizontal or vertical direction. When the video camera with the 2-d mechanism is used, very precise and various face images can be obtained by controlling a left or right horizontal rotation angle or an up or down vertical rotation angle of the 2-d mechanism while the person to be photographed does not move. On the other hand, a left or right horizontal rotation angle or an up or down vertical rotation angle of the person to be photographed can be controlled by loading the person to be photographed on the 2-d mechanism while the video camera does not move. At this time, a blue screen can be used as a background picture, and more than one light can be used to remove shade. However, it is understood that other environmental conditions can be used, and that various other techniques can be used to remove shade.

When the laser scanner is used, virtual simulation can be performed under various illumination conditions and different horizontal and vertical rotation angles. When the built-in studio is used, images with high quality may be obtained fast. The face images in this case are obtained in accordance with the number of cameras and positions of the cameras. Commonly, face images from 7 through 13 viewpoints may be obtained.

The eye position determiner 130 selects a plurality of key-frame images corresponding to predetermined viewpoints, from the face images shown from various viewpoints provided by the image capturer 110, and selects eye positions in the selected key-frame images according to a user's manipulation. Then, the eye position determiner 130 determines eye positions of face images corresponding to all viewpoints included in a mosaic view by applying various approximation or interpolation and smoothing methods to eye positions of the selected key-frame images. For example, if a mosaic view with respect to a person has view intervals of 10° in horizontal and vertical rotation angles and is of face images shown from viewpoints corresponding to horizontal rotation angles between −90° through 90° and vertical rotation angles between −30° through 30°, eye positions of face images shown from 19×7 (i.e., 133) viewpoints are determined using the eye positions of the plurality of key-frame images. While described in terms of eyes, it is understood that other distinctive features (such as ears, chin or nose) can be used in addition to or instead of the eyes.

The face localization unit 150 obtains face images including the eye positions of the respective viewpoints determined by the eye position determiner 130 from the face images provided by the image capturer 110, the localization unit 150 performs localization of the face images corresponding to the eye positions of the respective viewpoints, and arranges sizes and the eye positions of the face images shown from the respective viewpoints.

The mosaic view generator 170 generates a mosaic view of a single identity by synthesizing the localized face images from the respective viewpoints provided by the face localization unit 150.

Figure 2:
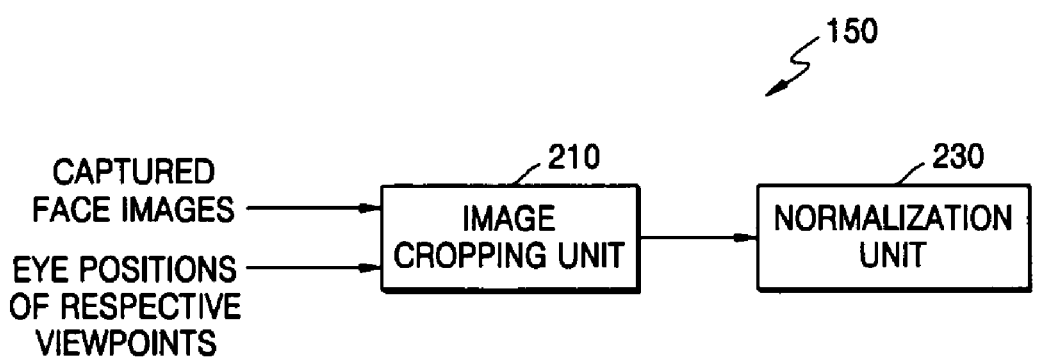
FIG. 2 is a block diagram of a face localization unit of FIG. 1 according to an embodiment of the invention.

FIG. 2 is a block diagram of the face localization unit 150 of FIG. 1. Referring to FIG. 2, the face localization unit 150 includes an image cropping unit 210 and a normalization unit 230. The image cropping unit 210 receives face images shown from each viewpoint included in a mosaic view, among face images shown from various viewpoints provided from the image capturer 110 and the eye positions of the respective viewpoints determined by the eye position determiner 130. The image cropping unit 210 crops face images having left rotation angles among face images shown from each viewpoint included in a mosaic view, based on a right eye position set in the front view face image and crops face images having right rotation angles, based on a left eye position set in the front view face image. According to this, just the face area occupies the cropped image for each view. While described as using rotations relative to the front view face image, it is understood that the rotations can be relative to other views according to aspects of the invention.

The normalization unit 230 normalizes sizes of the face images provided by the image cropping unit 210 to a predetermined size of a rectangular or ellipse type. In an embodiment of the present invention, the normalized size is a rectangle with 46×56 pixels or a square with 56×56 pixels.

Figure 3:
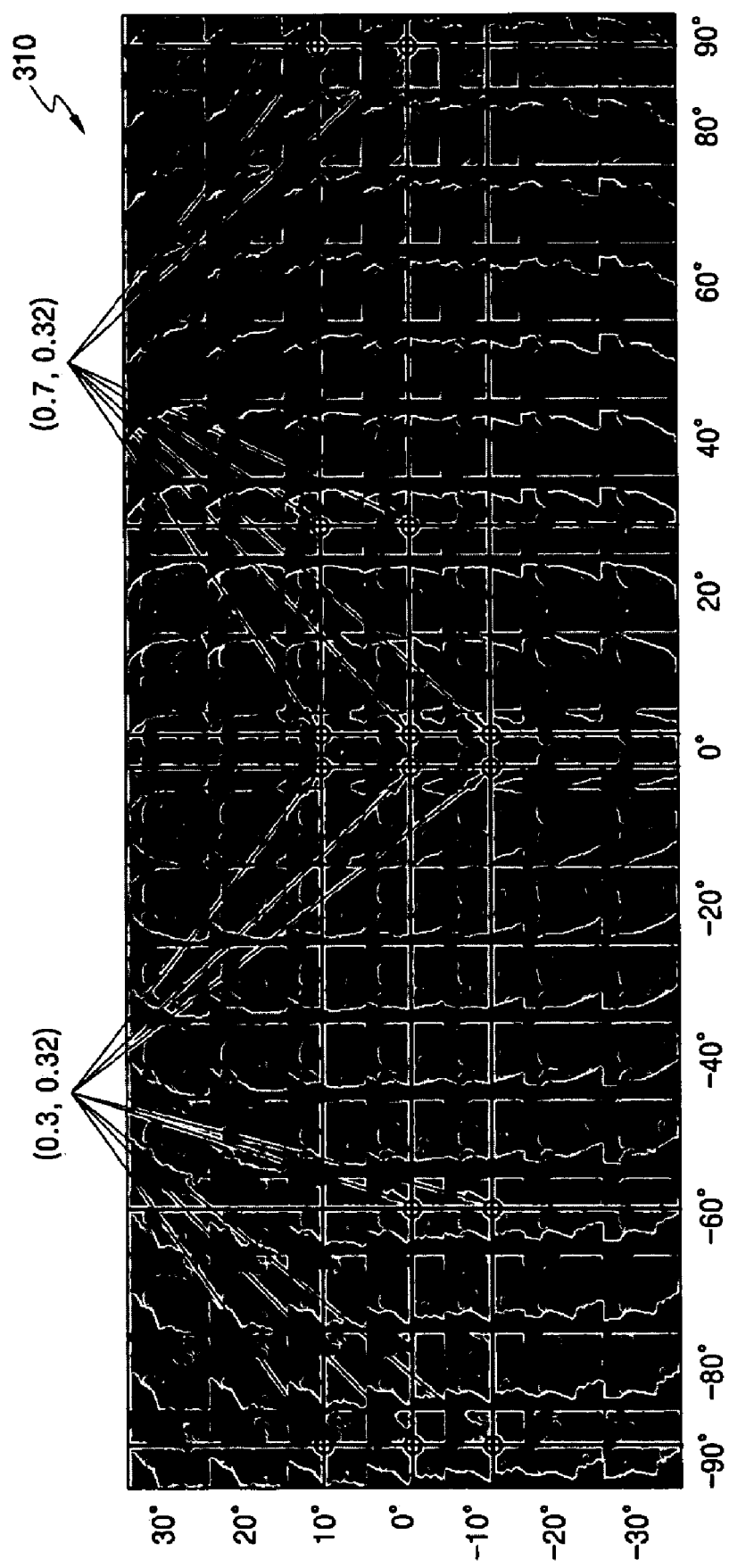
FIG. 3 illustrates an example of an operation of an image cropping unit of FIG. 2.

FIG. 3 illustrates an operation of an image cropping unit 210 of FIG. 2. Referring to FIG. 3, when each of left and right sizes of face images included in a mosaic view 310 is set to 1, in the front view face image of the mosaic view 310, a left eye position is set to (0.3, 0.32), and a right eye position is set to (0.7, 0.32). The image cropping unit 210 crops several images corresponding to a left rotation (i.e., −90° through 0°) at a predetermined size while keeping the position of the right eye to (0.3, 0.32) as shown in FIG. 3. In addition, the image cropping unit 210 crops several images corresponding to a right rotation (i.e., 0° through 90°) at a predetermined size while keeping the position of the left eye to (0.7, 0.32) as shown in FIG. 3. The eye positions of face images corresponding to up and down rotations for each horizontal viewpoint is set so that they are equal to eye positions of a face image having a 0° vertical rotation angle.

Figure 4A:
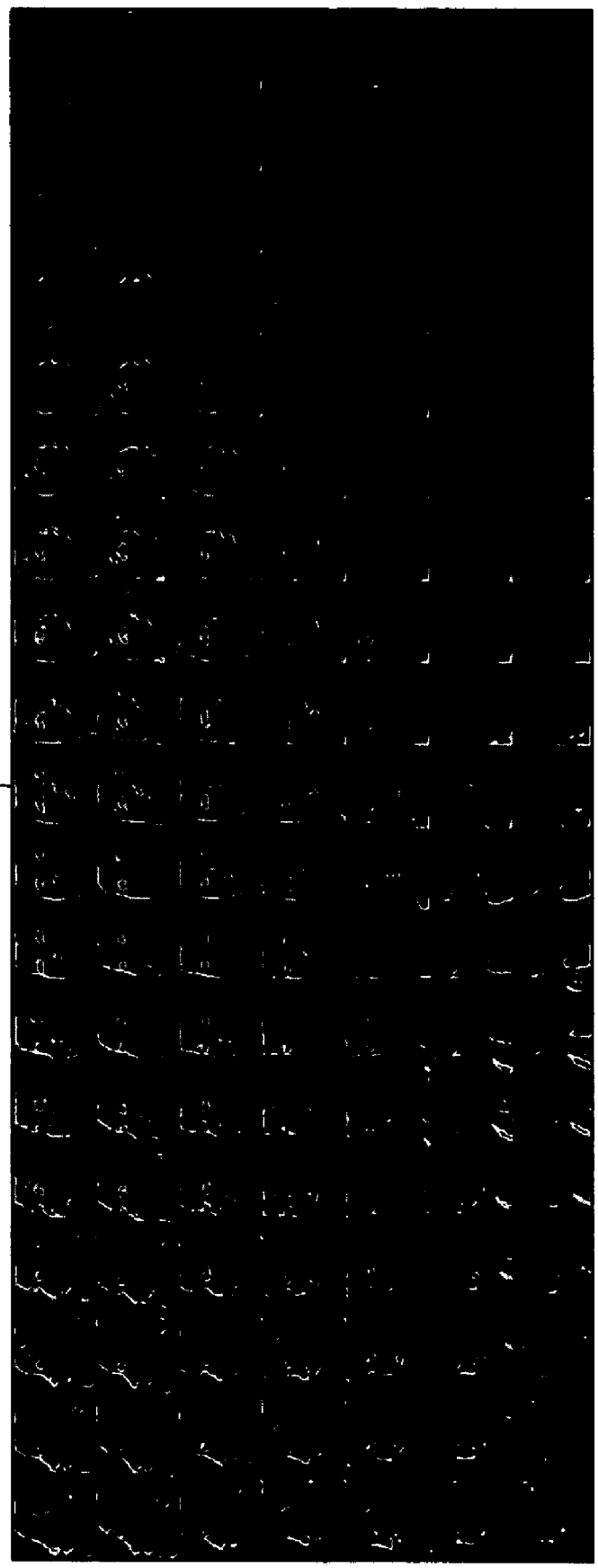
FIGS. 4A through 4C are examples of a mosaic view generated from the mosaic view generator of FIG. 1.
Figure 4B:
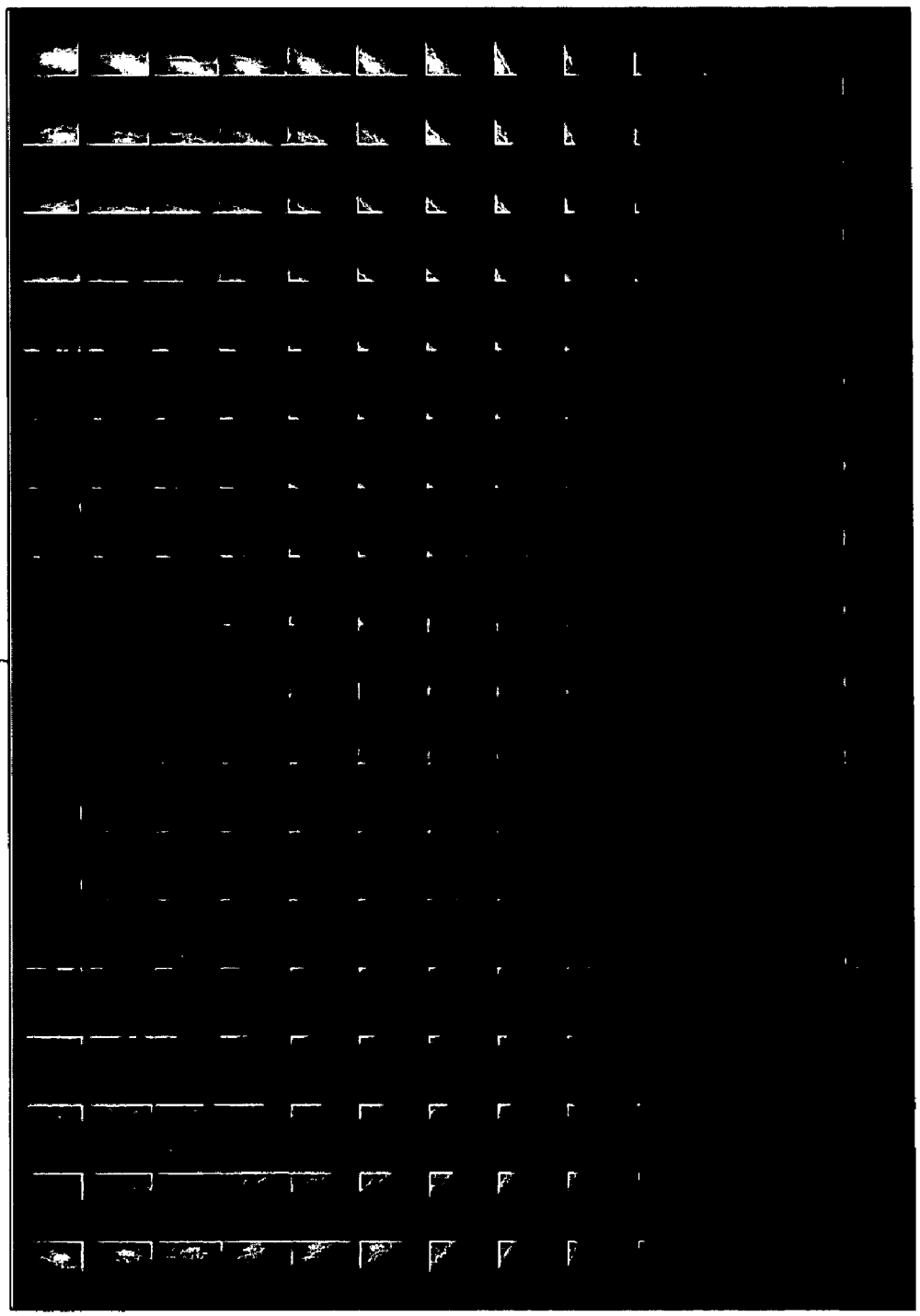
Figure 4C:
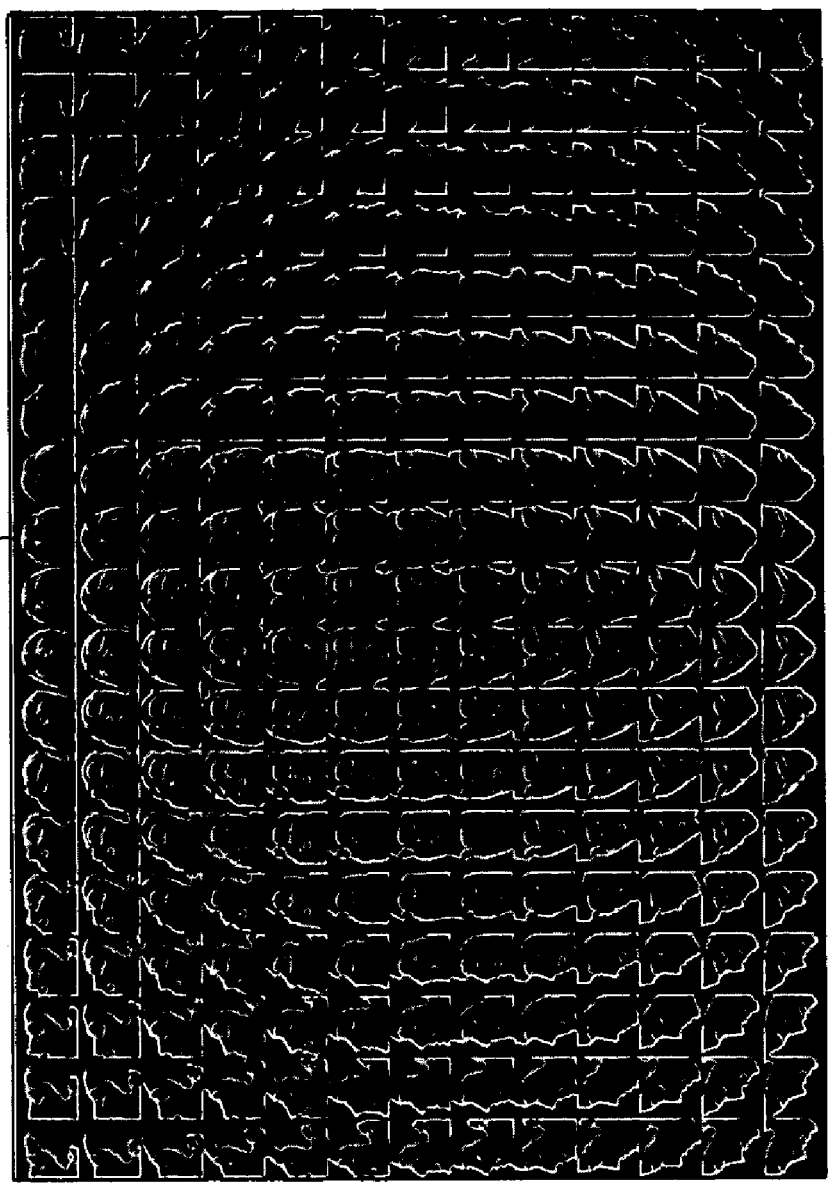
Figure 4C:
Figure 4C:
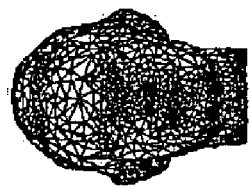
Figure 4C:

FIGS. 4A through 4C are examples of a mosaic view generated from the mosaic view generator 170 of FIG. 1. FIG. 4A shows a mosaic view 410 generated using face images obtained by a video camera (i.e., the image capturer 110 of FIG. 1 or the camera 1510 shown in FIG. 15). FIG. 4B shows a mosaic view 430 generated using a representative face among 108 Asian face models. FIG. 4C shows a mosaic view 450 generated using an image obtained by rendering a 3-dimensional-laser-scanned face model.

The mosaic view 410 shown in FIG. 4A has 19×7 face images obtained by right and left rotations and up and down rotations in the intervals [−90°, . . . , 90°] and [−30°, . . . , 30°] respectively, with a rotation step of 10°. Each of the mosaic views 430 and 450 shown in FIGS. 4B and 4C has 19×13 face images obtained by right and left rotations and up and down rotations in the intervals [−90°, . . . , 90°] and [−60°, . . . , 60°] respectively, with a rotation step of 10°. However, it is understood that other intervals and numbers of images can be used.

Figure 5:
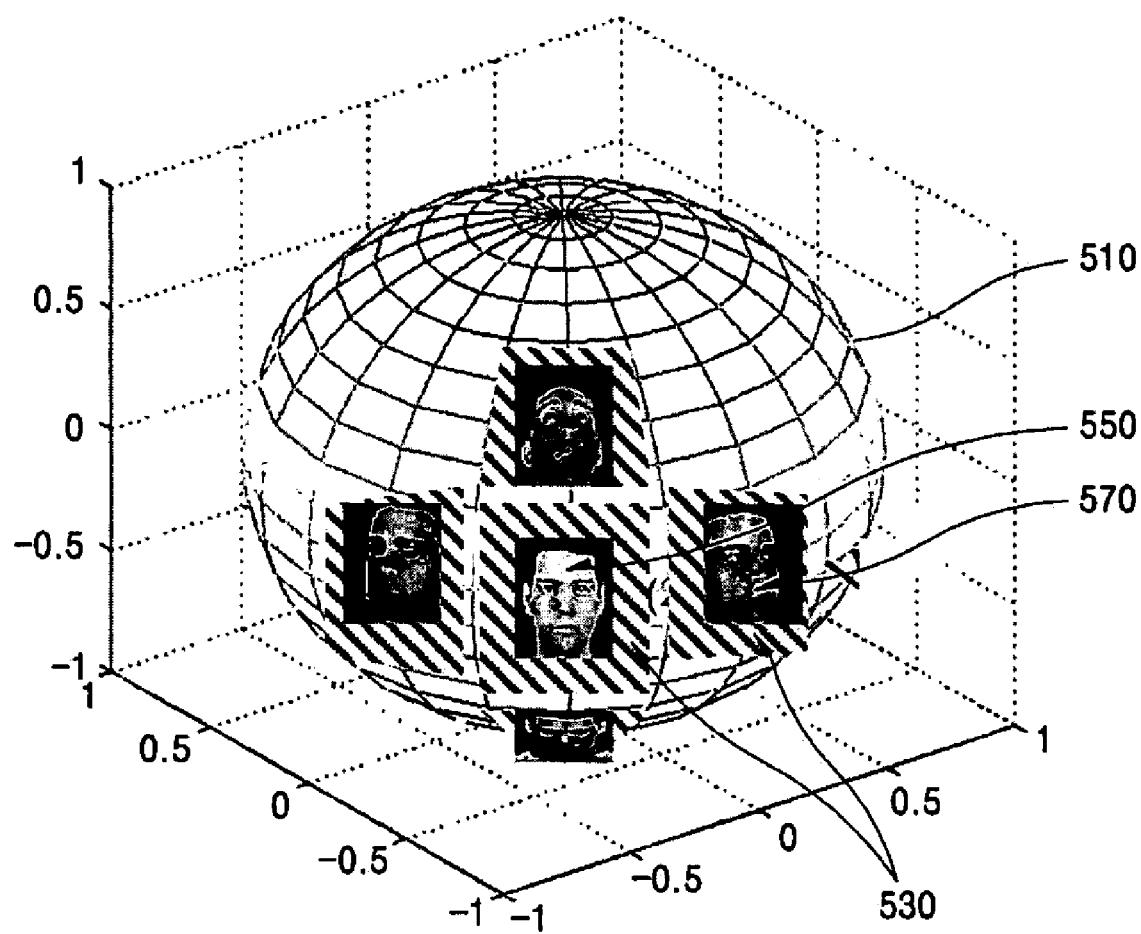
FIG. 5 illustrates a basis for setting a view interval of a mosaic view generator of FIG. 1.

FIG. 5 illustrates a basis for setting a view interval of the mosaic view generator 170 of FIG. 1. Referring to FIG. 5, a view sphere 510 is filled by multi-view face images. A shaded area 530 indicates a recognizable area when a front view face image 550 and a 30° horizontal view face image 570 are registered. As shown, one viewpoint supports up to a quasi region that is expanded up to around 15° up and down and left and right. Thus, the interval should be within the 15° quasi region. In the shown embodiment of the present invention, a view interval of a mosaic view is set to 10° that satisfies a condition of being within 15°.

FIG. 6 is a block diagram of an apparatus for generating a multi-view face descriptor according to an embodiment of the present invention. Referring to FIG. 6, the apparatus includes a multi-view face database 610, a basis matrix generator 630, a feature extractor 650, a to-be-registered view selector 670, and a face descriptor generator 690. While not required, it is understood that the apparatus shown in FIG. 6 can be included in a common unit with the apparatus shown in FIG. 1, such as using the system shown in FIG. 15, or can be implemented in separate units according to aspects of the invention.

The multi-view face database 610 stores a set of training face images and a set of test face images. Each face image includes a mosaic view of a single identity. The basis matrix generator 630 selects the training face images shown from each viewpoint from the multi-view face database 610 and generates a basis matrix of the training face images of the selected viewpoint. The basis matrix can be generated by various methods such as a principal component analysis (PCA) method, a linear discriminant analysis (LDA) method, or a Principal Component Linear Discriminant Analysis (PCLDA) method. However, it is understood that other methods can be implemented.

To provide more flexible information to a basis matrix of the training face images, training is performed to train face images of viewpoints adjacent to the selected viewpoint as well as train face images of the selected viewpoint according to an aspect of the invention. Also, according to the position of viewpoints, different sub-regions are assigned to face images and training is performed with respect to the sub-regions as well as the entire face image according to aspects of the invention.

The feature extractor 650 selects test face images shown from each viewpoint identical to the viewpoint used to generate the basis matrix, from the multi-view face database 610 and extracts and stores feature vectors of the selected test face images using the basis matrix of the training face images. Similarly, according to the position of viewpoints, different sub-regions are assigned to face images and features are extracted from the sub-regions as well as the entire face image.

The to-be-registered view selector 670 examines a quasi view size corresponding to each viewpoint using the stored feature vectors with respect to the set of test face images of the multi-view face database 610 and selects a plurality of viewpoints, which can cover up a mosaic view, as to-be-registered viewpoints according to the examination results. The quasi view size indicates the number of quasi views which can be retrieved in the set of test face images with a predetermined retrieval rate and a given viewpoint using the feature vectors extracted by the feature extractor 650. Here, the retrieval rate is evaluated using an Average Normalized Modified Retrieval Rank (ANMRR). The range of the ANMRR is between 0 and 1, and the smaller a value of the ANMRR, the higher the retrieval rate. In the shown embodiment, the retrieval rate is less than or equal to 0.05 ANMRR in a case where the mosaic view is constructed at view intervals of 10° in the horizontal and vertical rotation angles. Also, the to-be-registered view selector 670 may select a plurality of viewpoints whose quasi view size is larger than a predetermined value, select a plurality of viewpoints frequently appearing in real life, which are statistically analyzed, or select a plurality of viewpoints by combining the two cases described above. Moreover, it is understood that other methods beyond ANMRR can be used, and that other retrieval rates can be used.

The face descriptor generator 690 generates a multi-view face descriptor by synthesizing face descriptors having the plurality of viewpoints selected by the registered view selector 670.

Figure 7:
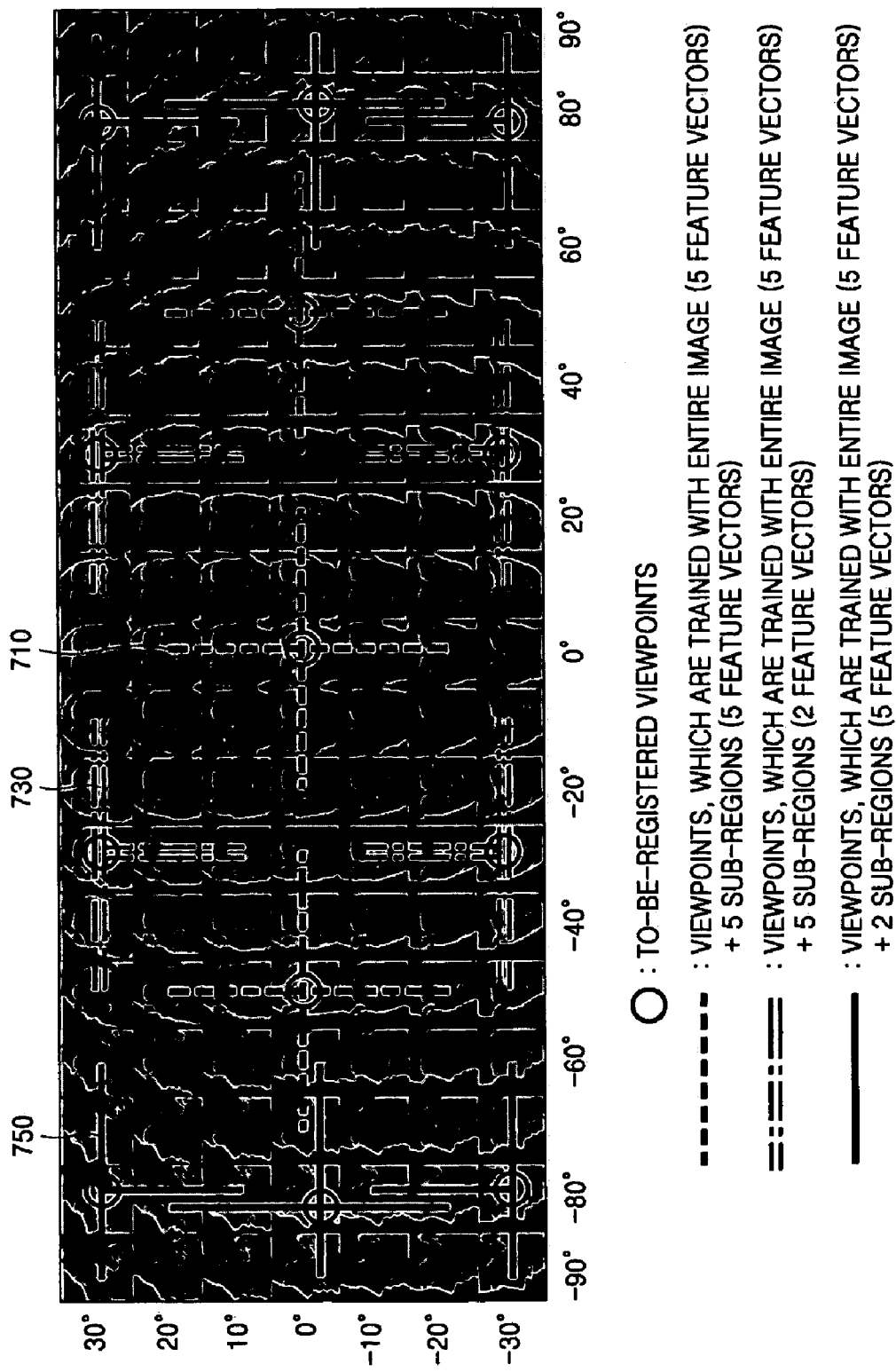
FIG. 7 illustrates an example of a plurality of viewpoints used for training in a basis matrix generator of FIG. 6.

FIG. 7 illustrates a plurality of viewpoints used for training in a basis matrix generator 630 of FIG. 6. Referring to FIG. 7, with respect to face images shown from one to-be-registered viewpoint, training is performed by including face images shown from adjacent viewpoints. As shown, in a case where parts classified by circles indicate the to-be-registered viewpoints, according to left/right and up/down rotation angles of each to-be-registered viewpoint, 5 entire feature vectors and 5 feature vectors of 5 sub-regions are used (refer to reference number 710), 5 entire feature vectors and 2 feature vectors of 5 sub-regions are used (refer to reference number 730), 5 entire feature vectors and 5 feature vectors of 2 sub-regions are used (refer to reference number 750) However, it is understood that more or less numbers of entire feature vectors and sub-region feature vectors can be used, or only entire feature vectors may be used. In FIG. 7, with respect to one to-be-registered viewpoint, training is performed by using face images shown from 6 through 9 viewpoints existing adjacent to each of the to-be-registered viewpoints.

Figure 8A:
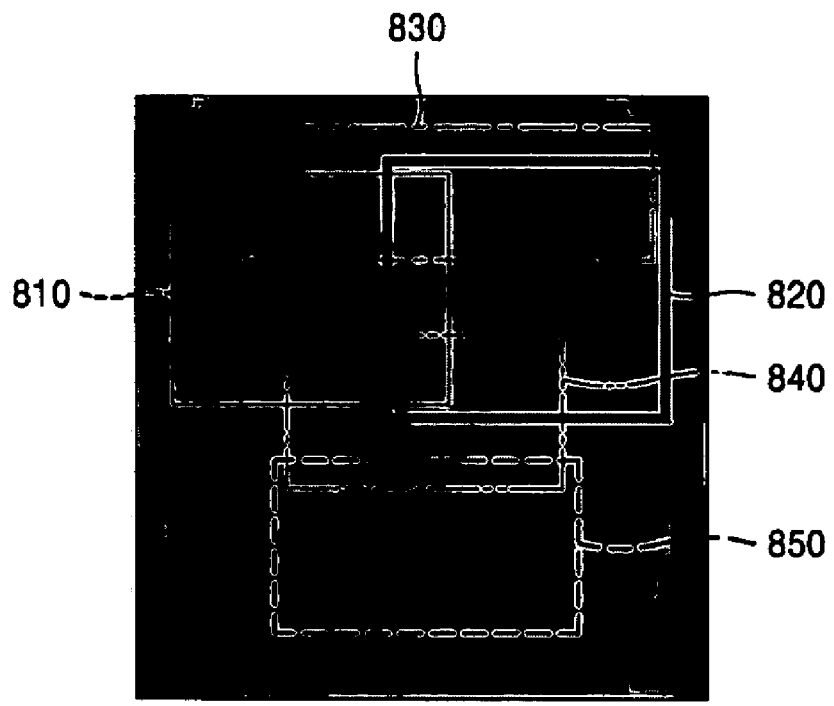
FIGS. 8A and 8B illustrate a method of setting sub-regions according to a viewpoint in a basis matrix generator and a feature extractor of FIG. 6
Figure 8B:
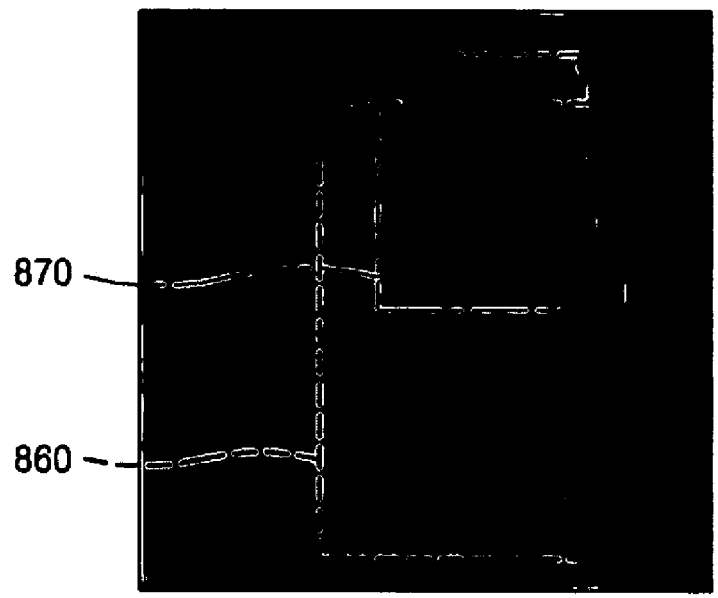

FIGS. 8A and 8B illustrate a method of setting sub-regions according to a viewpoint in a basis matrix generator 630 and a feature extractor 650 of FIG. 6. FIG. 8A shows sub-regions of a face image with respect to a front viewpoint and viewpoints close to the front viewpoint. In FIG. 8A, regions corresponding to both eyes 810 and 820, a forehead 830, a nose 840, and a mouth 850 are set to the sub-regions. However, it is understood that the sub-regions are not limited to these and can be otherwise defined. FIG. 8B shows sub-regions of a face image with respect to a viewpoint (−90°, 0°) or (90°, 0°) and viewpoints close to this viewpoint. In FIG. 8B, regions corresponding to a side face 860 and an eye 870 are set to the sub-regions. However, the sub-regions are not limited to them these and can be otherwise defined.

Figure 9:
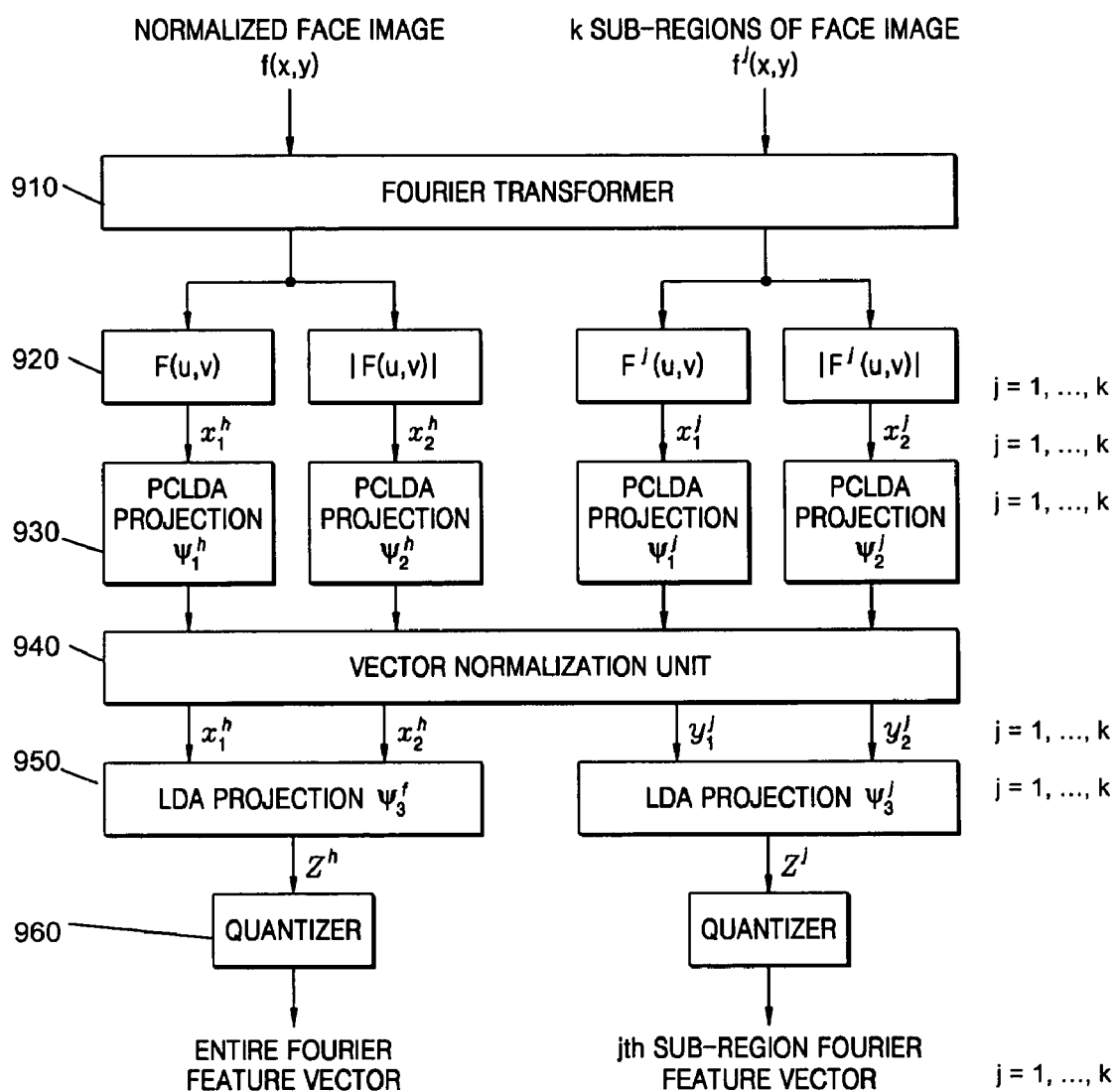
FIG. 9 is a block diagram of an embodiment of a feature extractor of FIG. 6.

FIG. 9 is a block diagram of a feature extractor 650 of FIG. 6. The feature extractor 650 uses at least one of a first method of extracting a feature vector of a face image in a frequency domain and a second method of extracting sub-region-based feature vectors in a space domain. The first method is proposed in "Report of the Core Experiments on Fourier Spectral PCLDA based Face Descriptor," by Toshio Kamei et al, in ISO-IEC-JTC1-SC29WG11, M8559, Klagenfurt, Austria, October 2002 the disclosure of which is incorporated by reference. The second method is proposed in "Component-based LDA Face Descriptor for Image Retrieval," by Taekyun Kim et al, in British Machine Vision Conference 2002, September 2002 the disclosure of which is incorporated by reference.

In an embodiment, the feature extractor 650 generates an entire Fourier feature vector of an input face image and sub-region-based Fourier feature vectors by setting different sub-regions according to viewpoints of the input face image, using the PCLDA method. Specifically, the normalized face image f(x,y) and each of the k subregions of the face image $f^j(x, y)$ (where j=1, ..., k) are fourier transformed using fourier transformer 910. An absolute value of the resulting fourier transformed images F(u,v) and $F^j(u,v)$ is created at unit 920, and the a PCLDA projection is performed for the fourier transformed images F(u,v) and $F^j(u,v)$ and the absolute values of the fourier transformed images F(u,v) and $F^j(u,v)$ using PCLDA projection units 930. A vector normalization unit 940 normalizes the output of the PCLDA projection units 930, and an LDA projection unit 950 performs LDA projection on the vector normalized output. A quantizer 960 quantizes the output $Z^h$ and $Z^j$ of the quantizer 960 so as to produce the fourier feature vector and the $j^{th}$ sub-region fourier feature vector. However, it is understood that other mechanisms can be used to generate feature vectors for the entire image and/or the sub-regions.

Figure 10:
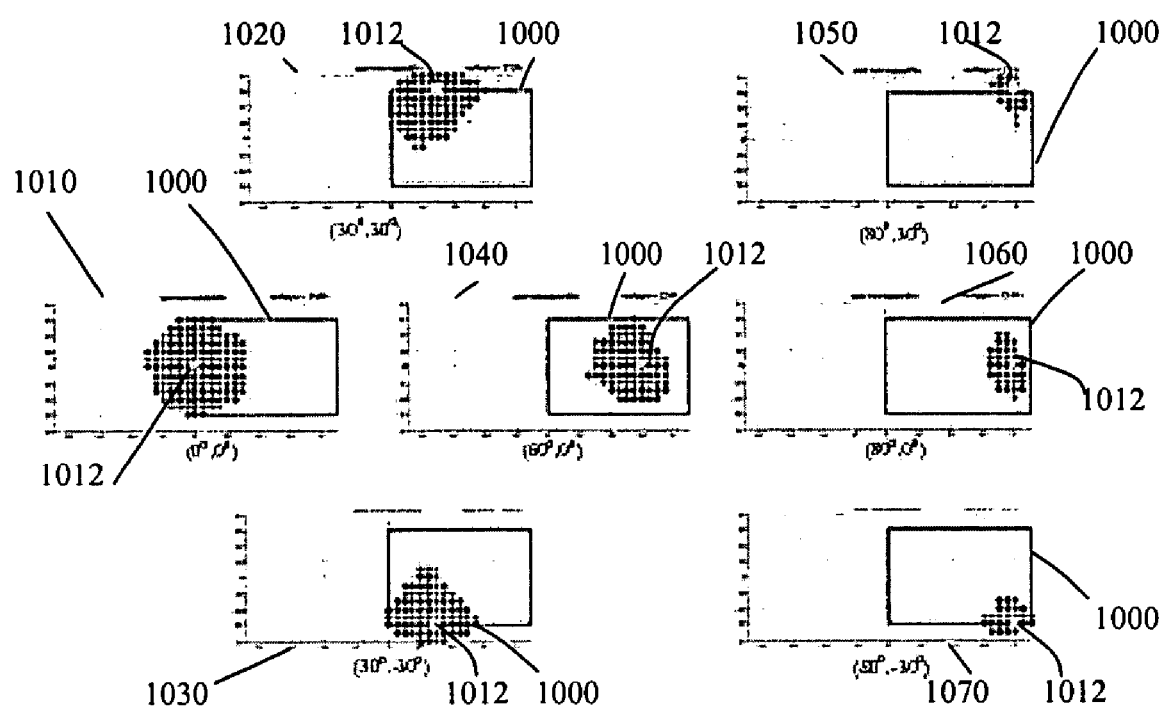
FIG. 10 illustrates an operation of a to-be-registered view selector of FIG. 6.

FIG. 10 illustrates an operation of a to-be-registered view selector 670 of FIG. 6. Referring to FIG. 10, a reference number 1000 indicates a mosaic view, and for convenience of description, only right rotations will be described. The simplest method of generating a face descriptor that can cover multi-view face images is to synthesize face descriptors with respect to a plurality of viewpoints obtained from a single identity and register the synthesized face descriptor. For example, a view rotation step is set to 10° with respect to each of horizontal and vertical rotation angles, and to cover the horizontal rotation angles between −90° and 90° and the vertical rotation angles between −30° and 30°, face descriptors with respect to 19×7 (i.e., 133) viewpoints can be registered. As a result, since the number of face descriptors to be registered for a single identity may be huge, optimization of the face descriptors is necessary. The to-be-registered view selector 670 performs the optimization process.

Embodiments of a process of optimizing face descriptors will now be described.

First, data analysis is performed. Poses appearing more frequently must be registered or considered as more important face descriptors, and poses rarely appearing are considered as less important face descriptors. For example, face images which are at downward and front perspectives are frequently used in an automatic teller machine (ATM) environment, and face images looking down, front face images, and side face images are frequently used in a door access environment. Accordingly, relevant face images are registered as more important face descriptors (i.e., the face descriptors to which feature vectors are allocated a lot).

Second, a multi-view face descriptor is generated by selecting and registering a few viewpoints. As a standard of selecting the viewpoints, viewpoints of which quasi view sizes are larger than a predetermined standard are selected by examining the quasi view sizes. It is more efficient to register a viewpoint having a large quasi view size rather than a viewpoint having a small quasi view size. Additionally, it is understood that, viewpoints frequently appearing in real life or other environments can be selected and that viewpoints easy to be registered or obtained can be selected according to aspects of the invention.

Third, the number of feature vectors is variously allocated according to viewpoints. If a viewpoint is easy to be obtained for registration and does not frequently appear in real life, a small number of feature vectors can be allocated. However, if a viewpoint frequently appears in real life or is more important, a large number of feature vectors can be allocated.

Fourth, to generate a face descriptor for dealing with pose changes more efficiently, a plurality of viewpoints are trained with respect to one to-be-registered viewpoint. If more flexible information with respect to the viewpoints can be included in a training process, registration can be performed with a relatively smaller number of images, i.e., one image for one viewpoint. For example, for a to-be-registered viewpoint (30°, 0°), face images shown from 9 viewpoints, such as (10°, 0°), (20°, 0°), (30°, 0°), (40°, 0°), (50°, 0°), (30°,−20°), (30°,−10°), (30°, 10°), and (30°, 20°), can be used for the training.

FIG. 10 also shows quasi view regions having less than 0.05 ANMRR. Referring to FIG. 10, a reference number 1010 indicates a quasi view region of a viewpoint (0°, 0°), a reference number 1020 indicates a quasi view region of a viewpoint (30°, 30°), a reference number 1030 indicates a quasi view region of a viewpoint (30°, −30°), a reference number 1040 indicates a quasi view region of a viewpoint (60°, 0°), a reference number 1050 indicates a quasi view region of a viewpoint (80°, 30°), a reference number 1060 indicates a quasi view region of a viewpoint (80°, 0°), and a reference number 1070 indicates a quasi view region of a viewpoint (80°, −30°). As shown in FIG. 10, the small rectangle spots are the registered views 1012 and small sphere spots indicate corresponding quasi-views with ANMRR less than or equal to 0.05. The large rectangle (i.e., reference number 1000) shows the view region of horizontal rotation [0° . . . 90°] and vertical rotation [−30° . . . 30°].

Figure 11:
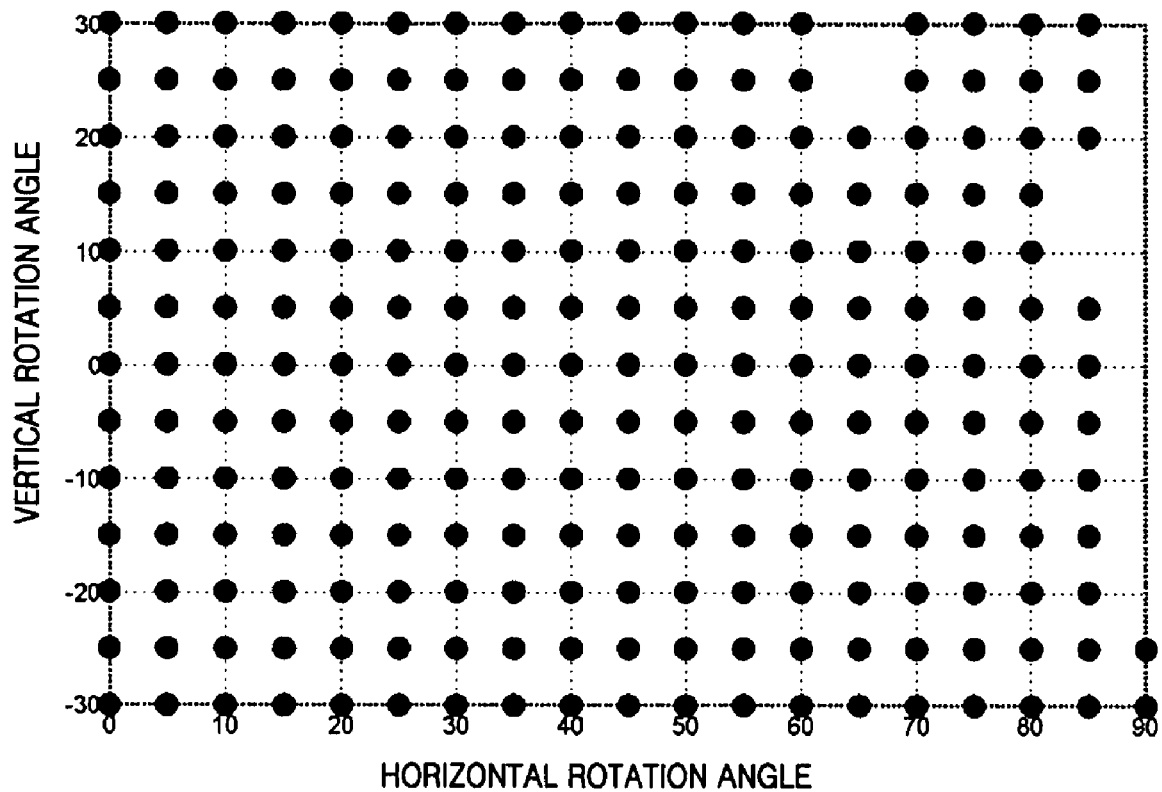
FIG. 11 shows an entire quasi view region obtained from 7 to-be-registered viewpoints shown in FIG. 10.

FIG. 11 shows an entire quasi view region obtained from 7 registered viewpoints shown in FIG. 10. Referring to FIG. 11, in a mosaic view of horizontal rotation angles [0°, . . . , 90°] and vertical rotation angles [−30°, . . . , 30°], an entire region covered by 7 to-be-registered viewpoints shown in FIG. 10 is 93.93% in a case of less than or equal to 0.05 ANMRR. The sphere spots shows the region covered by 7 quasi-views in the view-mosaic of horizontal rotation [0° . . . 90°] and vertical rotation [−30° . . . 30°] with ANMRR less than or equal to 0.05. The covered region is 93.93%.

Figure 12A:
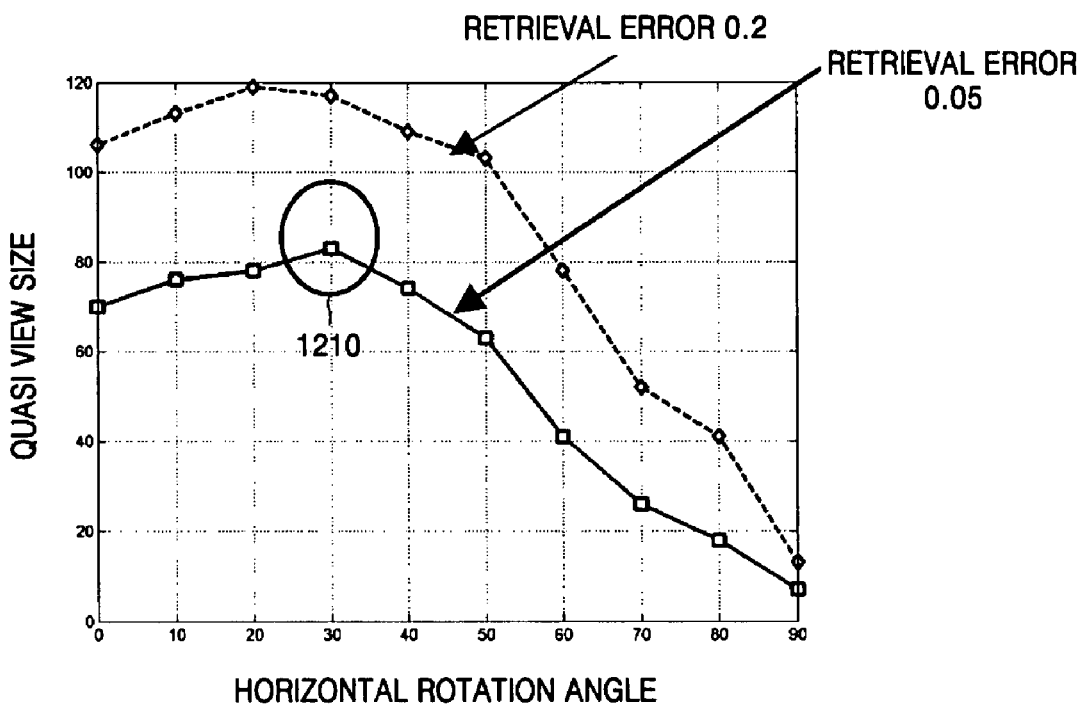
FIGS. 12A and 12B show graphs illustrating how a quasi view size is changed according to horizontal and vertical rotation angles of a face.
Figure 12B:
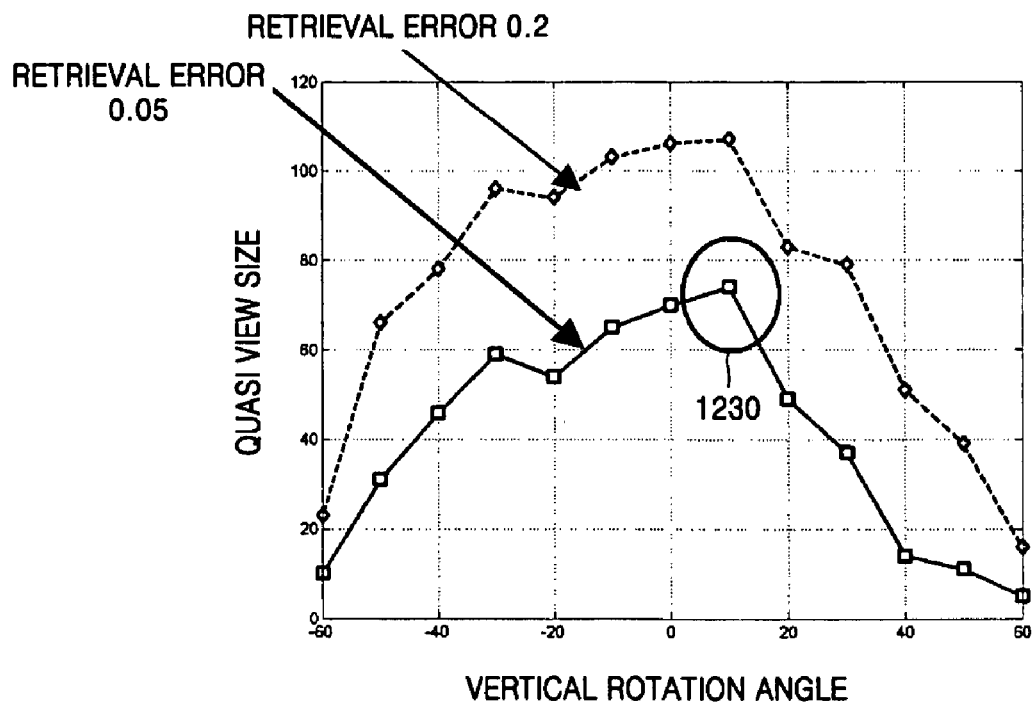

FIGS. 12A and 12B show graphs illustrating how a quasi view size is changed according to horizontal and vertical rotation angles of a face. Referring to FIGS. 12A and 12B, the graphs are obtained by dividing 108 face models into a proportion of 50:50, that is, using 54 3-dimensional face mesh models for training and 54 3-dimensional face mesh models for testing.

A method proposed by D. B. Graham and N. M. Allinson describes distances between face images according to poses to predict pose subordination in a face recognition system. For this, "Characterizing Virtual Eigensignatures for General Purpose Face Recognition" (in Face Recognition: From Theory to Applications, Berlin: Springer-Verlag, pp. 446-456, 1998) is referred to and incorporated by reference. Face images are separated so as to be more easily recognized using a distance scale in an eigenspace. An average Euclidean distance between face images in a database is sampled with respect to a horizontal or vertical rotation angle of each pose. According to this method, it can be predicted that it is easiest to recognize face images near to around a 30° range, and as the result, best pose samples used for analysis are mainly concentrated to the ranges. Also, it is anticipated that it is easier to recognize a face image from a front viewpoint (0°, 0°) rather than a profile viewpoint (90°, 0°). Also, a quasi view size is dependent on a viewpoint.

Comparing viewpoints to each other, 24 entire feature vectors (sub-region feature vectors are not used) are extracted for the viewpoints. Referring to FIG. 12A, with respect to horizontal rotation angles, 9 training viewpoints are used for each of viewpoints from (0°, 0°) to (70°, 0°), 8 training viewpoints are used for a viewpoint (80°, 0°), and 7 training viewpoints are used for a viewpoint (90°, 0°). Referring to FIG. 12B, with respect to vertical rotation angles, 9 training viewpoints are used for each of viewpoints from (0°, −40°) to (0°, 40°), 8 training viewpoints are used for viewpoints (0°, −50°) and (0°, 50°), and 7 training viewpoints are used for viewpoints (0°, −60°) and (0°, 60°).

The graph related to the horizontal rotation angles shown in FIG. 12A shows a very similar pattern to a graph disclosed in the method proposed by D. B. Graham and N. M. Allinson in "Characterizing Virtual Eigensignatures for General Purpose Face Recognition," showing an average distance between face images with respect to viewpoints. Viewpoints between (20°, 0°) and (30°, 0°) have the largest quasi view size, and the largest Euclidean distance exists between people in an eigenspace among viewpoints (0°, 0°), (10°, 0°), . . . , (90°, 0°). In the graph related to the vertical rotation angles shown in FIG. 12B, viewpoints between (0°, 0°) and (0°, 10°) have the largest quasi view size. That is, since down rotation viewpoints have a larger quasi view size than up rotation viewpoints, it can be predicted that a person viewed from a downward rather than upward perspective/viewpoints is easier to be recognized.

As an experimental result performed with various quasi view regions, a group of viewpoints is selected to generate a multi-view face descriptor. The multi-view face descriptor has 240 dimensions for a rendered image, and detailed contents are mentioned in Table 1.

TABLE 1

| Viewpoint | Extracted feature vectors | Feature vector dimension |
| --- | --- | --- |
| (0°, 0°) | Entire feature vectors + 5 sub-region feature vectors | 1 * 5 + 5 * 5 = 30 |
| (60°, 0°) | Entire feature vectors + 5 sub-region feature vectors | 1 * 5 + 5 * 5 = 30 |
| (30°, 0°) | Entire feature vectors + 5 sub-region feature vectors | 1 * 5 + 5 * 2 = 15 |
| (30°, 30°) | Entire feature vectors + 5 sub-region feature vectors | 1 * 5 + 5 * 2 = 15 |
| (30°, -30°) | Entire feature vectors + 2 sub-region feature vectors | 1 * 5 + 2 * 5 = 15 |
| (80°, 0°) | Entire feature vectors + 2 sub-region feature vectors | 1 * 5 + 2 * 5 = 15 |
| (80°, 30°) | Entire feature vectors + 2 sub-region feature vectors | 1 * 5 + 2 * 5 = 15 |
| (80°, -30°) | | |
| (-60°, 0°) | Entire feature vectors + 5 sub-region feature vectors | 1 * 5 + 5 * 5 = 30 |
| (-30°, 30°) | Entire feature vectors + 5 sub-region feature vectors | 1 * 5 + 5 * 2 = 15 |
| (-30°, -30°) | Entire feature vectors + 5 sub-region feature vectors | 1 * 5 + 5 * 2 = 15 |
| (-80°, 0°) | Entire feature vectors + 2 sub-region feature vectors | 1 * 5 + 2 * 5 = 15 |
| (-80°, 30°) | Entire feature vectors + 2 sub-region feature vectors | 1 * 5 + 2 * 5 = 15 |
| (-80°, -30°) | Entire feature vectors + 2 sub-region feature vectors | 1 * 5 + 2 * 5 = 15 |
| | Entire dimension of the extracted feature vectors | 240 |

The face descriptor shown in Table 1 can retrieve a set of test face images, which cover viewpoints of 93.93% among an entire region of a mosaic view with horizontal rotation angles in the interval [-90°, . . . , 90°] and vertical rotation angles in the interval [-30°, . . . , 30°], at less than or equal to ANMRR of 0.05. Also, the face descriptor can retrieve a set of test face images of 95.36% at less than or equal to ANMRR of 0.1, 97.52% at less than or equal to ANMRR of 0.15, and 97.98% at less than or equal to ANMRR of 0.2. As a reference, with respect to a photo image, a face descriptor has 128 dimensions for ANMRR of 0.2491 and 48 dimensions for ANMRR of 0.3013.

Figure 13A:
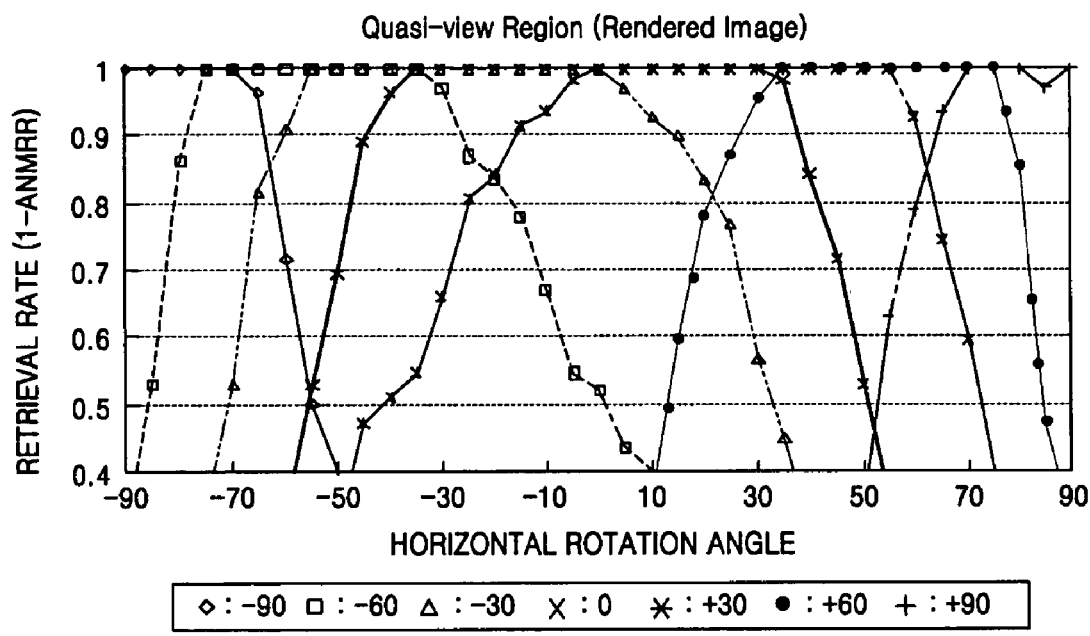
FIGS. 13A and 13B are graphs comparing quasi view regions of each viewpoint depending on recognition rates between a rendered image and a video image in a case of using a face descriptor according to an embodiment of the present invention.
Figure 13B:
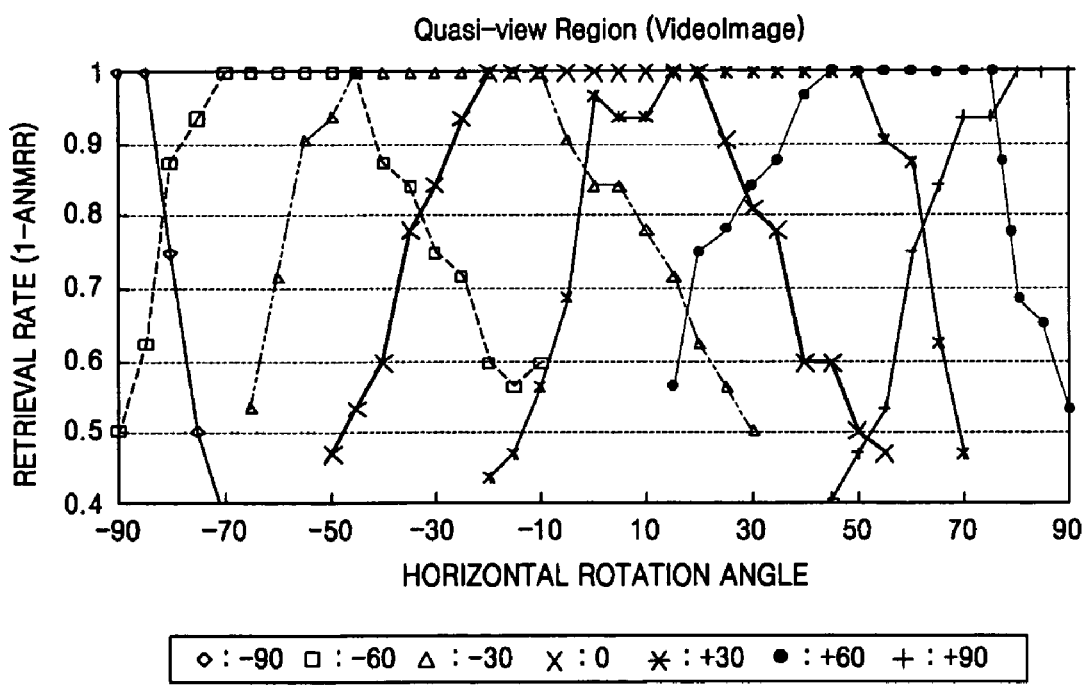

FIGS. 13A and 13B are graphs comparing quasi view regions of each viewpoint depending on recognition rates between a rendered image and a video image in a case of using a face descriptor according to an embodiment of the present invention. By comparing FIGS. 13A with 13B, it is understood that the size of a quasi view region for the video image is smaller that that for a rendered image since training data for the video image is not as accurate as that for the rendered image.

Figure 14A:
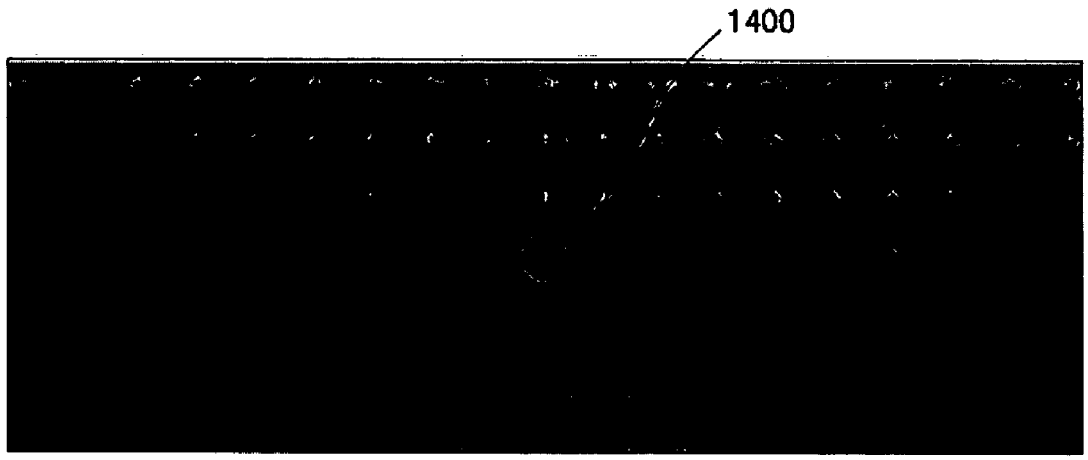
FIGS. 14A through 14C show performance evaluations of a face recognition algorithm using a conventional face descriptor and a face recognition algorithm using a face descriptor according to an embodiment of the present invention.
Figure 14B:
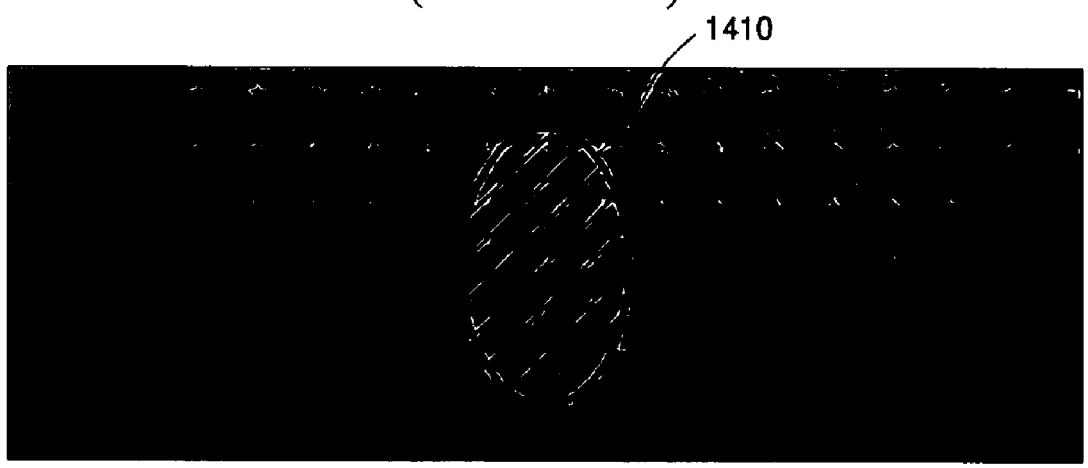
Figure 14C:
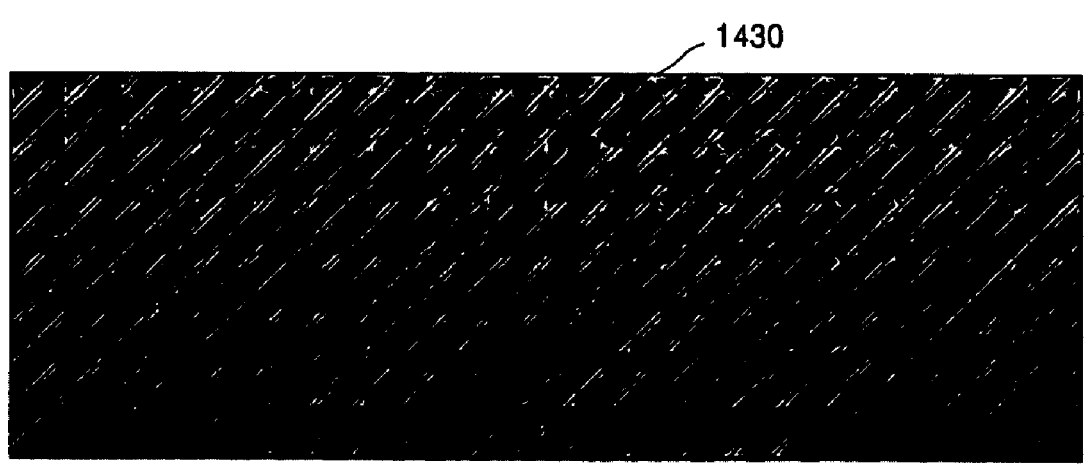

FIGS. 14A through 14C show performance evaluations of a face recognition algorithm using a conventional face descriptor and a face recognition algorithm using a face descriptor according to an embodiment of the present invention. In FIG. 14A, a reference number 1400 indicates a viewpoint of a registered face image. FIG. 14B shows a face recognizable region 1410 with respect to the viewpoint of the registered face image 1400. FIG. 14C shows a face recognizable region 1430 with respect to 13 registered viewpoints according to an embodiment of the present invention.

As a result of comparing FIG. 14B and FIG. 14C, while face recognition can be performed only for face images having limited viewpoints in the conventional method, according to an embodiment of the present invention, the face recognition can be performed for all face images in the mosaic view.

FIG. 15 is a schematic block diagram of an apparatus which identifies objects captured using a camera 1510 according to aspects of the present invention. The camera 1510 is used to obtain an image of a face to be identified. The camera 1510 is connected to a computer 1520. The computer 1520 accesses a database 1530 on which are stored the multi-view face database 610 and/or the multi-view face descriptors generated by the apparatus shown in FIG. 6. The computer 1520 compares the mosaic views and/or descriptors of the database 1530 with the input image to identify the face in the input image.

As shown, the camera 1510 is a digital camera. However, it is understood that the camera 1510 can have various resolutions, and that the camera 1510 can be part of a personal digital assistant (PDA), a telephone, a security camera used in a security system, a video camera from which individual images of frames (such as in MPEG video) are used for identification, or other similar device having a capacity to take pictures according to aspects of the invention. Moreover, it is understood that, instead of or in addition to the camera 1510, a scanner (not shown) can be used as a digital image input device in order to scan non-digital pictures into the computer 1520, or the digital image can be otherwise provided to the computer 1520 according to aspects of the invention. Lastly, while shown as connected, it is understood that the camera 1510 need not be connected to the computer 1520 in all aspects of the invention, and instead can transfer pictures either through the scanner (not shown), by uploading the image from a storage medium on which the camera 1510 stores pictures into the computer 1520, or across a networks using wired and/or wireless transmission techniques.

It is understood that the computer 1520 can be other types of computers, both general and special purpose, and can be portable or non-portable. Moreover, it is understood that the computer 1520 can be a series of computers which collectively analyze corresponding different images and/or generate the descriptors and/or mosaic views stored in the database 1530, such as through the use of grid computing or parallel processing. Moreover, where the computer 1520 is portable, the computer 1520 can also be a personal digital assistant or like portable computing device which performs the identification functions. It is further understood that the computer 1520 includes the systems of FIGS. 1, 2, and/or 6 according to aspects of the invention.

Additionally, in the shown embodiment, the database 1530 is shown as separate from the computer 1520 for the purposes of explanation. It is understood that, according to an aspect of the invention, the database 1530 is preferably included in the computer 1520 in order to reduce transfer time across a network. If the database 1530 is stored separately according to an aspect of the invention, the database 1530 is connected to the computer 1520 across a network, such as a local area network, the Internet, or other wired or wireless networks. As such, where the images are used to identify persons such as for the purposes of security, the images on the database 1530 can be used by any number of computers 1520 at different locations for use in identifying persons being photographed by a camera at each of the different locations. Thus, using a single location, the database 1530 can be kept current according to an aspect of the invention. Alternately, the database 1530 can be mailed or transmitted to each location for use within the corresponding computer 1520, or the database 1530 at each location can be updated from the single location across a network according to an aspect of the invention. Such a separately stored database 1530 can be stored in a separate location, such as a Government agency, for use in verifying passport identities or for identifying persons wanted by various law enforcement agencies by way of example.

Such a database 1530 can comprise data stored on storage media, such as magnetic media such as a hard disc drive, on magneto-optical media, and on optical media such as compact discs (CDs), digital versatile discs (DVDs), and next generation optical discs such as Bluray discs and Advanced Optical Discs (AODs) according to aspects of the invention. Moreover, the database 1530 can be read only, write once, or rewritable media. Where the database 1530 is writable or rewritable, it is understood that the mosaic views and/or descriptors can be updated to reflect new images without retransmitting all mosaic views and/or descriptors in the database 1530. Such an updatable property would be useful where a new individual is first recognized at one of the locations, and the remaining locations can there be updated to reflect the new individual's image so as to keep the database 1530 current.

The invention can also be embodied as computer readable codes on at least one computer readable recording medium for use on one or more computers. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be a distributed network coupled computer system so that the computer readable code is stored and executed in a distributed fashion. Also, functional programs, codes, and code segments for accomplishing the present invention can be easily construed by programmers skilled in the art to which the present invention pertains.

Additionally, while described in terms of recognition of faces, it is understood that the present invention can be applied to identification of non-humans such as animals or plants, and can be used to identify inanimate objects as well as animate objects.

As described above, according to the present invention, by recognizing a face using a multi-view face descriptor obtained by expanding a single-view face descriptor using a quasi view size, face recognition can be performed for any posed face image, and very high recognition performance can be guaranteed as compared with a conventional face descriptor recognizing only front view face images. Particularly, since a face under any viewpoint can be recognized using the multi-view face descriptor based on poses, the multi-view face descriptor can be very efficiently applied to a surveillance system.

Also, since the multi-view face descriptor according to the present invention includes 3-dimensional information of an identity, the multi-view face descriptor can be widely applied to retrieval, search and browsing with respect to image, video, and 3-dimensional face model databases.

While aspects of the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. An apparatus for generating a multi-view face descriptor comprising:
   a multi-view face database which stores sets of training face images and sets of test face images, each set including a mosaic view of a single identity;
   a basis matrix generator which generates a basis matrix of the training face images shown from respective viewpoints searched from the multi-view face database;
   a feature extractor which extracts feature vectors of a test face image shown from each viewpoint using the basis matrix of the training face images searched from the multi-view face database;
   a to-be-registered view selector which searches the test face images using the feature vectors extracted by the feature extractor and selects a plurality of the viewpoints as registered viewpoints according to the search results; and
   a face descriptor generator which generates a multi-view face descriptor by synthesizing face descriptors having the plurality of selected viewpoints.

2. The apparatus of claim 1, wherein the basis matrix generator performs training of viewpoints adjacent to a predetermined viewpoint as well as the predetermined viewpoint.

3. The apparatus of claim 1, wherein the basis matrix generator designates different sub-regions on the face images, according to up and down rotation angles and left and right rotation angles of the face images.

4. The apparatus of claim 3, wherein the basis matrix generator designates different feature vectors in the sub-regions on the face images, according to up and down rotation angles and left and right rotation angles of the face images.

5. The apparatus of claim 1, wherein the feature extractor designates different sub-regions on the face images, according to up and down rotation angles and left and right rotation angles of the face images.

6. The apparatus of claim 5, wherein the feature extractor designates different feature vectors in the sub-regions on the face images, according to up and down rotation angles and left and right rotation angles of the face images.

7. The apparatus of claim 1, wherein the feature extractor generates an entire Fourier feature vector and sub-region Fourier feature vectors of the test face image and sets different sub-regions according to the viewpoints.

8. The apparatus of claim 1, wherein the to-be-registered view selector statistically analyzes face descriptors with a plurality of viewpoints, whose quasi view size is larger than a predetermined value, and viewpoints, which frequently appear in real life, and selects the registered viewpoints by combining at least one standard among the face descriptors with a plurality of viewpoints according to the analysis result and face descriptors with a plurality of viewpoints, with which quasi views corresponding to the given viewpoints can cover the mosaic view.

9. A method of generating a multi-view face descriptor comprising:
   providing a multi-view face database storing sets of training face images and sets of test face images, each set including a mosaic view of a single identity;
   generating a basis matrix of the training face images shown from respective viewpoints searched from the multi-view face database;

extracting feature vectors of a test face image shown from each viewpoint using the basis matrix of the training face images searched from the multi-view face database; and searching, using at least one processing device, the test face images using the feature vectors extracted by the feature extractor, selecting a plurality of viewpoints as registered viewpoints according to the search results and generating a multi-view face descriptor by synthesizing face descriptors having the plurality of selected viewpoints.

10. The method of claim 9, wherein, in the generating of the multi-view face descriptor, face descriptors with a plurality of viewpoints, whose quasi view size is larger than a predetermined value, are selected.

11. The method of claim 9, wherein, in the generating of the multi-view face descriptor, viewpoints, which frequently appear in real life, are statistically analyzed, and the face descriptors with a plurality of viewpoints are selected according to the analysis result.

12. The method of claim 9, wherein, in the generating of the multi-view face descriptor, face descriptors with a plurality of viewpoints, with which quasi views corresponding to the given viewpoints can cover the mosaic view, are selected.

13. The method of claim 9, wherein the generating of a basis matrix further comprises training the selected respective viewpoints and adjacent viewpoints together.

14. At least one computer readable recording medium having recorded thereon a computer readable program to control at least one processing device to perform a method of generating a multi-view face descriptor performed by one or more computers, the method comprising:

providing a multi-view face database storing sets of training face images and sets of test face images, each set including a mosaic view of a single identity;

generating a basis matrix of the training face images shown from respective viewpoints searched from the multi-view face database;

extracting feature vectors of a test face image shown from each viewpoint using the basis matrix of the training face images searched from the multi-view face database; and searching the test face images using the feature vectors extracted by the feature extractor, selecting a plurality of viewpoints as registered viewpoints according to the search results and generating a multi-view face descriptor by synthesizing face descriptors having the plurality of selected viewpoints.

15. An apparatus for generating a multi-view descriptor relative to a selected view using a multi-view database which stores sets of training images and sets of test images, each set including a mosaic view of a single identity, comprising:

a basis matrix generator which generates a basis matrix of the training images shown from respective viewpoints searched from the multi-view database;

a feature extractor which extracts feature vectors of a test image shown from each viewpoint using the basis matrix of the training images;

a view selector which searches the test images using the feature vectors extracted by the feature extractor and selects ones of the viewpoints as registered viewpoints according to the search results; and a descriptor generator which generates a multi-view descriptor by synthesizing descriptors having the plurality of selected viewpoints.

16. The apparatus of claim 15, wherein:

the feature vectors comprise entire image feature vectors and subregion feature vectors, and the feature extractor further selects sub-regions of the test images and obtains the subregion feature vectors from the subregions test images, and obtains the entire image feature vectors from the test images.

17. The apparatus of claim 16, wherein each of the subregion feature vectors and the entire image feature vector corresponds to one of the selected viewpoints and enable identification of the corresponding object when the viewpoint is other than the selected viewpoint.

18. The apparatus of claim 15, wherein each feature vector defines at least one quasi view of a corresponding one of the selected viewpoints and which is not included in the selected viewpoints, and the at least one quasi view allows identification of an object in a rotational range relative to the corresponding one selected viewpoint.

19. The apparatus of claim 18, wherein the rotational range of the quasi view relative to the corresponding one selected viewpoint varies as a function of rotational angle of the selected viewpoint relative to a primary viewpoint.

20. The apparatus of claim 16, wherein a number of subregions for one of the selected viewpoints is different from a number of subregions for another one of the selected viewpoints.

21. The apparatus of claim 16, wherein the feature extractor comprises:

a fourier transformer which, for each test image, fourier transforms the test image and at least one of the subregions of the test image, an entire image projection unit which, for each test image, projects the fourier transformed test image to obtain the entire image feature vector for the test image, and a subregion image projection unit which, for each subregion of the test image, projects the fourier transformed subregion image to obtain the subregion image feature vector for the subregion of the test image.

22. The apparatus of claim 21, wherein the entire image projection unit and the subregion image projection unit use at least one of a principal component analysis (PCA) method, a linear discriminant analysis (LDA) method, or a Principal Component Linear Discriminant Analysis (PCLDA) method to obtain the entire image and subregion image feature vectors.

* * * * *